United States Patent Office 3,032,221
Patented May 1, 1962

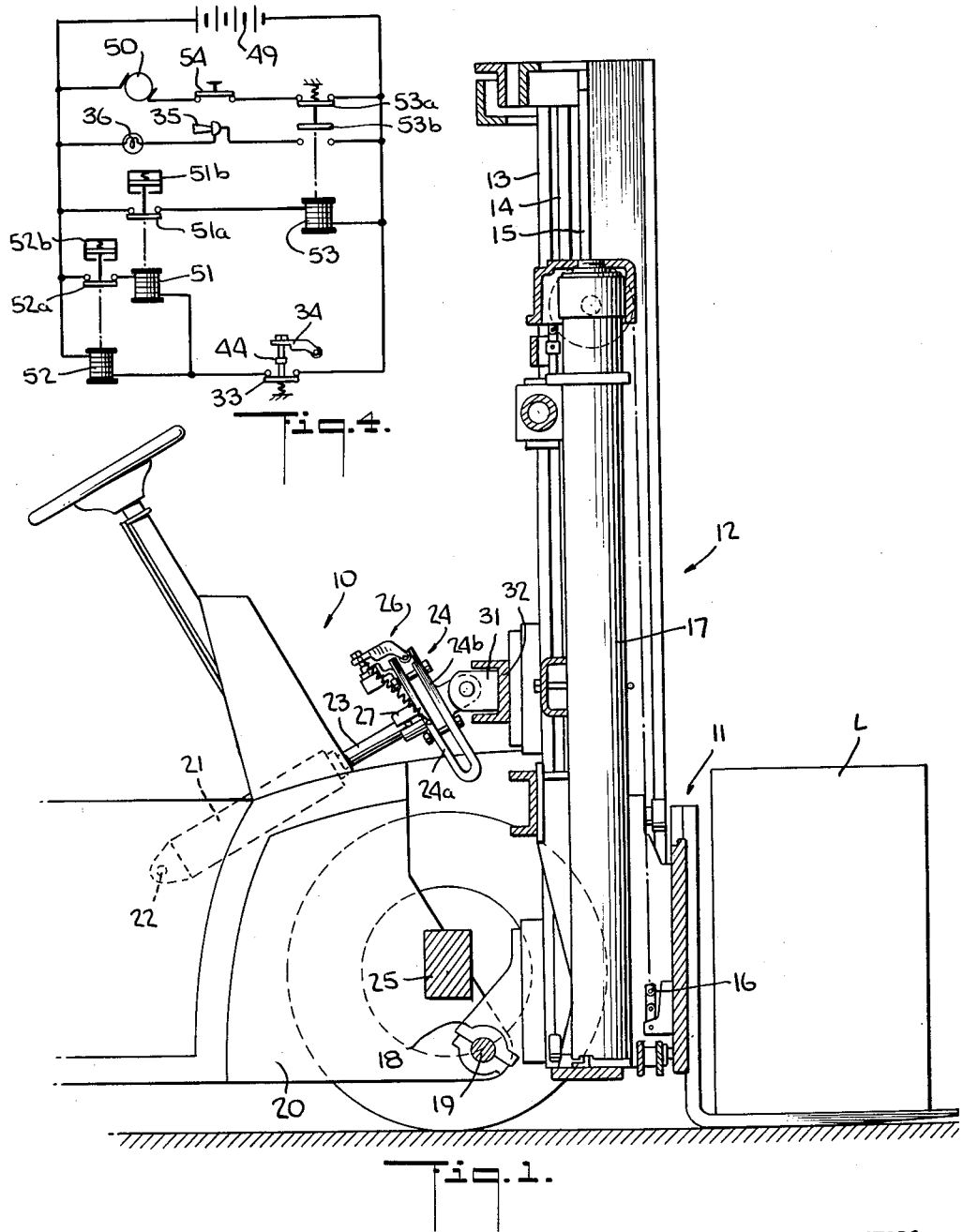

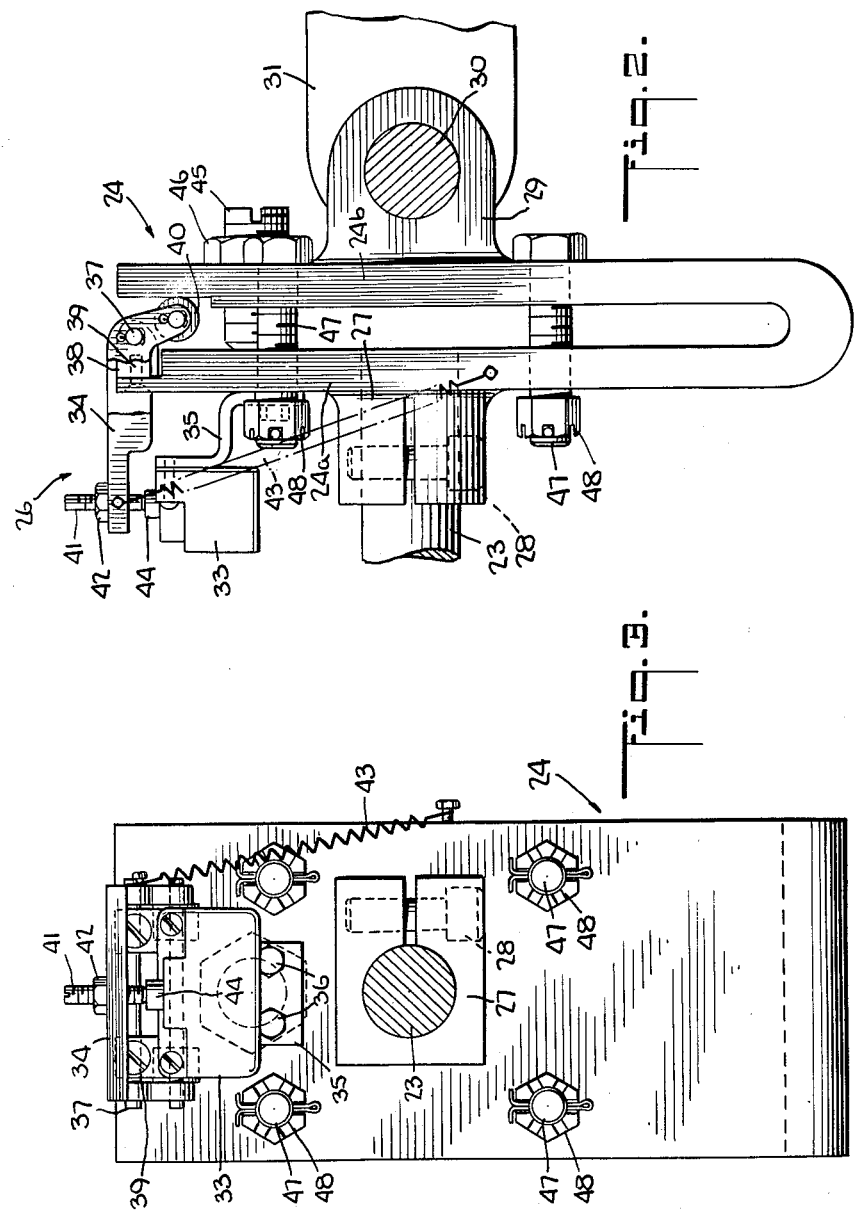

3,032,221
OVERLOAD DETECTING SYSTEM
Oswald S. Carliss, Rydal, and Earl A. Horton, Philadelphia, Pa., assignors to The Yale and Towne Manufacturing Company, Stamford, Conn., a corporation of Connecticut
Filed Mar. 22, 1960, Ser. No. 16,822
12 Claims. (Cl. 214—673)

This invention relates to a lift truck of the type incorporating an overload detecting system for indicating when excessive tipping moment is applied to the truck by a load positioned on the load carriage of the truck.

In a conventional lift truck, the load carriage, or load forks, are supported for vertical movement on a vertically extending mast structure. The mast structure is pivotally mounted on the truck for slight fore and aft tilting movement to facilitate stabilizing a load positioned on the load carriage. This tilting movement of the mast structure is effected by operation of a ram interconnecting the mast structure and the truck. The load carriage extends forwardly of the front axle of the truck, and accordingly, the placing of a load on the load carrier results in a moment being applied to the mast structure tending to tilt the mast structure around its pivotal mounting. This moment is in turn transmitted through the mast tilting ram to the truck so that the truck is subjected to a moment tending to tip the truck about its front axle. The magnitude of his moment tending to tip the truck depends on the weight of the load and the distance the center of gravity of the load is positioned from the front axle of the truck. If this moment is too great, the back wheels of the truck may be actually lifted from the ground with resulting danger of spilling of the load from the load carriage, or injury to the operator or truck.

This danger of resulting from tipping of the truck has long been recognized, and various devices and arrangements for automatically detecting and indicating when excessive tipping moment is applied to a truck have been proposed and used. However, these devices and arrangements as heretofore proposed have either been so complicated that they require substantial modification of the conventional lift truck, or have not been sufficiently sensitive to changes in the moment applied to the truck. This lack of sensitivity necessitates the setting of such devices for a much lower moment than the safe limit for the truck with the result that the truck is not used to its actual safe maximum capacity.

The present invention provides a detecting system which not only can be used on standard lift trucks without substantial modification of the truck, but which at the same time is extremely sensitive to small changes in moment so that the trucks can be used substantially up to their maximum capacity without danger of overloading.

The system of the present invention is similar to systems heretofore proposed in that a stress-responsive connection is provided between the tilting ram and the mast structure to detect changes in the tipping moment applied to the truck. However, unlike the systems heretofore proposed in which it was deemed necessary to use a pressure cylinder and piston as the stress-responsive connection, it has been found, in accordance with the present invention, that a simple mechanical spring may be used as the stress-responsive connection. More important, it has been found that not only is a mechanical spring simpler and not subject to failure due to leakage, as is the case in the use of a pressure cylinder, but that a mechanical spring is much more sensitive to changes in the tipping moment applied to the truck. This is due, at least in part, to the fact that in using a mechanical spring there is no friction loss, while in using a pressure cylinder there is necessarily a friction loss. In the present invention the mechanical spring connection deflects when a predetermined moment is applied to the truck by a load positioned on the load carriage and control means responsive to this deflection of the spring is provided to actuate a suitable warning device such as a light or horn, or to stop lifting movement of the load carriage or operation of the truck when the degree of deflection indicates that the tipping moment applied to the truck is near the safe limit.

In a preferred form of the invention the mechanical spring connection comprises a simple U-shaped spring having one arm thereof connected to the tilting ram and the other arm connected to the mast structure. A simple limit switch is actuated when the arms are separated a predetermined amount indicating that the tipping moment of the truck is near the safe limit.

The invention having been broadly described, a more detailed description is given hereafter by reference to the accompanying drawings, wherein:

FIG. 1 is a partial sectional view of a lift truck incorporating an overload detecting system constructed in accordance with the present invention, FIG. 2 is an enlarged view of the detecting unit as shown in FIG. 1, FIG. 3 is a left side view of the detecting unit as shown in FIG. 2, and FIG. 4 is an electrical diagram for a control circuit adapted to be used with the overload detecting system of the invention.

Referring to the drawings and particularly to FIG. 1, the overload detecting system of the invention is shown incorporated in a lift truck generally designated by the reference numeral 10. While the particular truck shown in the drawings is of the type shown in co-pending United States application, Serial No. 690,476, now Pat. No. 2,936,047, filed October 16, 1957, by George F. Quayle, it will be appreciated that this is for the purpose of illustration and that the invention is equally applicable to other types and styles of lift trucks.

Referring to FIG. 1, truck 10 includes a load carriage 11 which is mounted for vertical movement on a vertically extendable mast structure 12 which includes primary, secondary and tertiary uprights 13, 14 and 15 respectively. The secondary and tertiary uprights 14 and 15 of the mast structure 12 are adapted to be extended upwardly relatively to primary upright 13, and the load carriage 11 is adapted to be elevated on the mast structure through chains 16, by operation of a ram 17.

The mast structure 12 is pivotally mounted for fore and aft tilting movement by means of a bearing 18 which is secured to the lower end of the primary uprights 13 and is journaled on a shaft 19 which is secured to the frame 20 of the truck. This tilting movement allows the mast to be tilted a few degrees backwards to stabilize a load positioned on the load carriage 11.

The mast structure 12 is adapted to be tilted about the shaft 19 by a mast tilting ram 21 which is pivotally connected at 22 to the frame 20 of the truck. In accordance with the invention the piston rod 23 of the ram 21 is connected to the mast structure 12 through a mechanical spring 24. As shown in FIG. 1, the spring 24 is preferably of a simple U-shape with one arm 24a connected to the piston rod 23 and the other arm 24b pivotally connected to the primary uprights 13 of the mast structure 12.

It will be appreciated that when a load, such as indicated at L in FIG. 1, is positioned on the load carriage 11 and the load carriage is elevated, that a moment is applied to the mast structure 12 tending to tilt the mast structure about the shaft 19. This moment in turn is transmitted through the spring 24 and the tilting ram 21 to the truck frame so that the truck is subjected to a moment tending to tip the truck about its front axle 25 and to lift the rear wheels (not shown) from the ground. The transmission of the moment from the mast 12 to the truck 10 through the spring 24 results in a tensile force being applied to the spring 24 tending to deflect the spring by moving the arms 24a and 24b apart. This tensile force is proportional to the tipping moment applied to the truck frame.

As will be described in more detail hereafter, the spring 24 is preferably pre-stressed so that it requires a substantial force to deflect the spring and the spring will not, therefore, be constantly flexed under normal loads. However, the pre-stressing of the spring 24 is not so great that it will not deflect under a tensile force approaching that corresponding to the maximum safe moment that can be applied to the truck without tipping of the truck, and in accordance with the invention this deflection of the spring 24 is detected by control means responsive to separating movement of the arms 24a and 24b of the spring 24. In the form illustrated in FIG. 1, the control means comprise a limit switch 26 which is released when the spring 24 is deflected a predetermined amount indicating that the tipping moment is near the safe limit. Because there is no frictional loss in deflecting the spring 24, and as the frictional loss of the limit switch 26 is quite small, the detecting system is extremely sensitive and is responsive to a very small change in the moment applied to the truck. Thus, the system of the invention allows the truck to be operated much closer to the maximum capacity than has been the case with systems of this type heretofore proposed.

The limit switch 26 may be used to operate a warning device, such as a horn or a light, or may be used to prevent lifting of the load or operation of the truck. Preferably, the limit switch operates through a suitable time delay device which prevents operation of the warning device, or prevents stopping of the lifting of the load carriage or stopping of the truck by a mere momentary overload that may occur due to inertia forces during stopping and starting of the truck or stopping and starting of the load carriage. Similarly, a suitable time delay device is preferably used to prevent the warning device from being cut off, the load carriage from being lifted, or the truck from being started if the overload is only momentarily relieved due to inertia forces. A typical electrical control circuit for use with the detecting system in controlling the lifting of the load carriage is shown in the diagram of FIG. 4, and will be described in detail hereafter.

Referring to FIGS. 2 and 3, the spring 24 is conveniently secured to the end of the piston rod 23 by means of a split collar 27 which is welded to the arm 24a of the spring 24 and is clamped to the end of the piston rod 23 by a suitable clamping bolt 28. The arm 24b of the spring 24 is pivotally connected to the primary uprights 13 by means of an eye member 29 which is welded to the arm 24b and receives a pin 30 of a clevis member 31. As shown in FIG. 1, the clevis member 31 is secured to a transverse frame member 32 which in turn is attached to the primary uprights 13.

The limit switch 26 includes a switch element 33 and a switch actuating bell crank 34. The switch element 33 is conveniently secured to the arm 24a by means of a bracket 35 and bolts 36, best shown in FIG. 3. The bell crank 34 is pivotally mounted on a pin 37 which in turn is carried by bracket 38. Bracket 38 is secured to the upper end of arm 24a of the spring 24 by means of screws 39. One end of the bell crank 34 is provided with a roller 40 which engages the inner surface of the arm 24b of the spring 24. A switch actuating screw 41 is threaded through the other end of bell crank 34 and is adapted to be locked in adjusted position by a lock nut 42. A tension spring 43 connected at one end of the bell crank 34 and connected at the other end to the arm 24a urges the bell crank 34 and the switch actuating screw 41 towards a pushbutton 44 of the switch 33.

During normal operation of the truck, the bell crank 34 is prevented from being moved by the spring 43 towards the pushbutton 44 by engagement of the roller 40 with the inner surface of the arm 24b. If, however, excessive tipping moment is applied to the truck, the spring 24 will be deflected so that the arms 24a and 24b are moved apart allowing the end of the bell crank 34 carrying the roller 40 to move upwardly and the end of the bell crank 34 carrying screw 41 to move downwardly under the influence of the tension spring 43 towards switch 33 so that screw 41 depresses the pushbutton 44. Depressing pushbutton 44 actuates switch 33 to operate a warning device, stop lifting of the load carriage, or stop operation of the truck, as the case may be, if the overload is not relieved within a short period determined by a suitable time delay device. When the overload is relieved, the arms 24a and 24b of the spring 24 move toward each other due to the inherent resiliency of the spring 24 so that the end of the bell crank 34 carrying the roller 40 is cammed downwardly to pivot the other end of the bell crank 34 carrying the screw 41 away from the pushbutton 44 to release switch 33.

As previously stated, the spring 24 is preferably pre-stressed so that it requires a substantial force to deflect the spring, and the spring will not, therefore, be constantly flexed under normal loads. Thus the spring provides a substantially stable connection between the piston rod 23 and the mast 12 in the handling of normal loads. Referring to FIGS. 2 and 3, the spring 24 is conveniently pre-stressed by means of a screw 45 which is threaded through the arm 24b of the spring 24 and bears against the inner surface of the arm 24a. Thus by rotation of the screw 45 the arms 24a and 24b of the spring 24 may be moved apart to pre-stress the spring to the desired degree. The screw 45 may be locked in any adjusted position by a lock nut 46.

In order to prevent overstressing of the spring 24, four spaced bolts 47 are provided which extend between and through the arms 24a and 24b and receive nuts 48 on the ends therefor so as to limit the deflection of the arms 24a and 24b of the spring 24, while still allowing sufficient deflection to insure release of the bell crank 34 and operation of the switch 33.

Referring to FIG. 4, there is shown an electrical diagram for a typical control circuit for use with the detecting system to stop lifting of the load carriage 11 in the event of an overload. In the diagram all solenoids are shown energized so that a circuit is completed from a battery 49 to a pump motor 50. The pump motor 50 drives a pump (not shown) for supplying fluid under pressure to the ram 17 to elevate the load carriage 11.

If during operation of pump motor 50 there is an overload so that the spring 24 is deflected an amount sufficient to release the bell crank 34, the switch 33 will be actuated to open the contacts thereof thereby breaking the circuit to the solenoid of a relay 51 and the circuit to the solenoid of a relay 52 so that contacts 51a and 52a may open. Relay 51 has a dashpot 51b, or similar time delay device, which delays the opening of contacts 51a for a short period after the solenoid 51 has been de-energized. If the overload is not relieved during this delay, contacts 51a open breaking the circuit to a motor control relay 53 so that contacts 53a open to stop operation of the motor 50 and, therefore, stop lifting of the load carriage 11 by the ram 17.

The delay in opening the contacts 51a provided by the dashpot 51b prevents the stopping of the motor 50 and, therefore, the stopping of the load carriage, by a momentary overload, such as may be caused by inertia forces acting momentarily to increase the effective weight of the load.

When the overload is relieved, the contacts 33 close thereby completing a circuit to relay 52 to energize the solenoid thereof to close contacts 52a. Relay 52 has a dashpot 52b, or similar delay device, which delays the closing of the contacts 52a for a short period after the solenoid of relay 52 has been energized. This delay prevents starting of the motor 50 by a momentary relief in overload as may be caused by inertia forces acting momentarily to decrease the effective weight of the load. If there is no overload after the delay, contacts 52a close completing a circuit to the solenoid of relay 51 so that contacts 51a close to complete a circuit to motor control relay 53 to start operation of pump motor 50. The pump motor 50 may be independently stopped by opening a switch 54.

The control circuit may also include warning devices such as a horn 35 and a light 36 which may be operated by a second set of contacts 53b which close when the solenoid of relay 53 is de-energized. When the horn 35 or light 36 are included, the contacts 53a can, if desired, be eliminated so that only the horn 35 or light 36 are operated by the opening of contacts of the switch 33. With such an arrangement, the motor 50 can then be stopped by the operator opening switch 54 manually when warned by the horn 35 or the light 36.

From the preceding description it can be seen that there is provided a very simple, but yet very sensitive overload detecting system. The system may be easily applied to new lift trucks, or existing lift trucks merely by disconnecting the mast tilting ram from the mast, shortening the piston rod of the tilting ram, connecting the spring 24 to the end of the piston rod and to the mass structure, and making a few simple electrical connections.

While a preferred form of the invention has been shown and described, it will be appreciated that changes and modifications may be made therein without departing from the spirit and scope of the invention.

We now claim:

1. An industrial truck comprising a frame, a mast pivotally mounted on said frame adjacent the front of said truck for fore and aft tilting movement, load supporting means mounted on said mast for supporting a load in front of said mast whereby a moment is applied to said mast by said load tending to tilt said mast forwardly, connecting means extending between said mast and said frame for resisting forward tilting movement of said mast, said connecting means including a resilient spring which deflects a predetermined amount when a predetermined moment is applied to said mast by a load supported by said load supporting means, and means operatively connected with said spring for detecting said predetermined deflection of said spring.

2. An industrial truck comprising a frame, a mast pivotally mounted on said frame adjacent the front of said truck for fore and aft tilting movement, load supporting means mounted on said mast for supporting a load in front of said mast whereby a moment is applied to said mast by said load tending to tilt said mast forwardly, connecting means extending between said mast and said frame for resisting forward tilting movement of said mast, said connecting means including a resilient spring which deflects a predetermined amount when a predetermined moment is applied to said mast by a load supported by said load supporting means, means operatively connected with said spring for detecting said predetermined deflection of said spring, and means for prestressing said spring to prevent deflection of said spring by a moment less than said predetermined moment.

3. An industrial truck comprising a frame, a mast pivotally mounted on said frame adjacent the front of said truck for fore and aft tilting movement, load supporting means mounted on said mast for supporting a load in front of said mast whereby a moment is applied to said mast by said load tending to tilt said mast forwardly, connecting means extending between said mast and said frame for resisting forward tilting movement of said mast, said connecting means including a resilient spring which deflects a predetermined amount when a predetermined moment is applied to said mast by a load supported by said load supporting means, means operatively connected with said spring for detecting said predetermined deflection of said spring, and means operatively connected with said spring for limiting the deflection of said spring.

4. An industrial truck comprising a frame, a mast pivotally mounted on said frame adjacent the front of said truck for fore and aft tilting movement, load supporting means mounted on said mast for supporting a load in front of said mast whereby a moment is applied to said mast by said load tending to tilt said mast forwardly, connecting means extending between said mast and said frame for resisting the said forward tilting movement of said mast, said connecting means including a resilient spring which deflects a predetermined amount when a predetermined moment is applied to said mast by a load supported on said load supporting means, means operatively connected with said spring for detecting said predetermined deflection of said spring, means operatively connected with said spring for prestressing said spring to prevent deflection of said spring by a moment less than said predetermined moment, and means operatively connected with said spring for limiting the deflection of said spring to prevent overstressing of said spring.

5. An industrial truck comprising a frame, a mast pivotally mounted on said frame adjacent the front of said truck for fore and aft tilting movement, load supporting means mounted on said mast for supporting a load in front of said mast whereby a moment is applied to said mast by said load tending to tilt said mast forwardly, connecting means extending between said mast and said frame for resisting forward tilting movement of said mast, said connecting means including a resilient spring which deflects a predetermined amount when a predetermined moment is applied to said mast by a load supported by said load supporting means, and control means operatively connected with said spring and operable by said predetermined deflection of said spring.

6. An industrial truck comprising a frame, a mast pivotally mounted on said frame adjacent the front of said truck for fore and aft tilting movement, load supporting means mounted on said mast for supporting a load in front of said mast whereby a moment is applied to said mast tending to tilt said mast forwardly, a U-shaped spring having one arm connected to said frame and the other arm connected to said mast whereby forward tilting movement of said mast is resisted and said spring is deflected a predetermined amount when a predetermined moment is applied to said mast by a load supported on said load supporting means, and means operatively connected with said spring for detecting said predetermined deflection of said spring.

7. An industrial truck comprising a frame, a mast pivotally mounted on said frame adjacent the front of said truck for fore and aft tilting movement, load supporting means mounted on said mast for supporting a load in front of said mast whereby a moment is applied to said mast tending to tilt said mast forwardly, a U-shaped spring having one arm connected to said frame and the other arm connected to said mast whereby forward tilting movement of said mast is resisted and said spring is deflected a predetermined amount when a predetermined moment is applied to said mast by a load supported on said load supporting means, means operatively connected with said spring for detecting said predetermined deflection of said spring, and adjustable means carried by said spring for moving said arms of said spring apart to prestress said spring whereby said spring will not be deflected by a moment less than said predetermined moment.

8. An industrial truck comprising a frame, a mast pivotally mounted on said frame adjacent the front of said truck for fore and aft tilting movement, load supporting means mounted on said mast for supporting a load in front of said mast whereby a moment is applied to said mast tending to tilt said mast forwardly, a U-shaped spring having one arm connected to said frame and the other arm connected to said mast whereby forward tilting movement of said mast is resisted and said spring is deflected a predetermined amount when a predetermined moment is applied to said mast by a load supported on said load supporting means, means operatively connected with said spring for detecting said predetermined deflection of said spring, and means carried by said spring for limiting movement of said arms apart to prevent overstressing said spring.

9. An industrial truck comprising a frame, a mast pivotally mounted on said frame adjacent the front of said truck for fore and aft tilting movement, load supporting means mounted on said mast for supporting a load in front of said mast whereby a moment is applied to said mast tending to tilt said mast forwardly, a U-shaped spring having one arm connected to said frame and the other arm connected to said mast whereby forward tilting movement of said mast is resisted and said spring is deflected a predetermined amount when a predetermined moment is applied to said mast by a load supported on said load supporting means, means operatively connected with said spring for detecting said predetermined deflection of said spring, and a screw threaded through one arm of said spring and bearing against the other arm of said spring whereby said arms of said spring may be moved apart by rotation of said screw to pre-stress said spring whereby said spring will not be deflected by a moment less than said predetermined moment.

10. An industrial truck comprising a frame, a mast pivotally mounted on said frame adjacent the front of said truck for fore and aft tilting movement, load supporting means mounted on said mast for supporting a load in front of said mast whereby a moment is applied to said mast by said load tending to tilt said mast forwardly, a ram, connecting means connecting one end of said ram to said frame and connecting means connecting the other end of said ram to said mast whereby forward tilting movement of said mast may be resisted and said mast may be tilted by operation of said ram, one of said connecting means including a resilient spring that deflects a predetermined amount when a predetermined moment is applied to said mast by a load supported on said load supporting means, and means operatively connected with said spring for detecting said predetermined deflection of said spring.

11. An industrial truck comprising a frame, a mast pivotally mounted on said frame adjacent the front of said truck for fore and aft tilting movement, load supporting means mounted on said mast for supporting a load in front of said mast whereby a moment is applied to said mast by sail load tending to tilt said mast forwardly, a ram, connecting means connecting one end of said ram to said frame and connecting means connecting the other end of said ram to said mast whereby forward tilting movement of said mast may be resisted and said mast may be tilted by operation of said ram, one of said connecting means including a resilient spring that deflects a predetermined amount when a predetermined moment is applied to said mast by a load supported on said load supporting means, means operatively connected with said spring for detecting said predetermined deflection of said spring, and means operatively connected with said spring for pre-stressing said spring to prevent deflection by a moment less than said predetermined moment.

12. An industrial truck comprising a frame, a mast pivotally mounted on said frame adjacent the front of said truck for fore and aft tilting movement, load supporting means mounted on said mast for supporting a load in front of said mast whereby a moment is applied to said mast tending to tilt said mast forwardly, a ram, connecting means connecting one end of said ram to said frame, connecting means connecting the other end of said ram to said mast whereby forward tilting movement of said mast may be resisted and said mast may be tilted by operation of said ram, one of said connecting means including a U-shaped spring that deflects a predetermined amount when a predetermined moment is applied to the mast by a load supported on said load supporting means, and means operatively connected with said spring for detecting said predetermined deflection of said spring.

References Cited in the file of this patent
UNITED STATES PATENTS

| | | |
|---|---|---|
| 2,704,132 | Marco | Mar. 15, 1955 |
| 2,751,994 | Remde | June 26, 1956 |
| 2,767,394 | Arnot et al. | Oct. 16, 1956 |
| 2,800,190 | Dvorak | July 23, 1957 |